Figure 8:
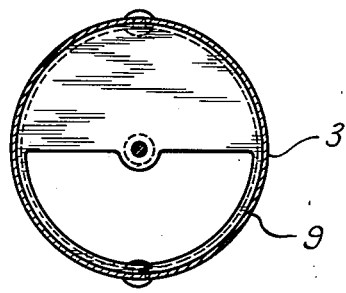

Sept. 23, 1952  W. F. PEYTON  2,611,514
CULTIVATING IMPLEMENT WITH FERTILIZER DISPENSER IN HANDLE
Filed Jan. 31, 1947  2 SHEETS—SHEET 1
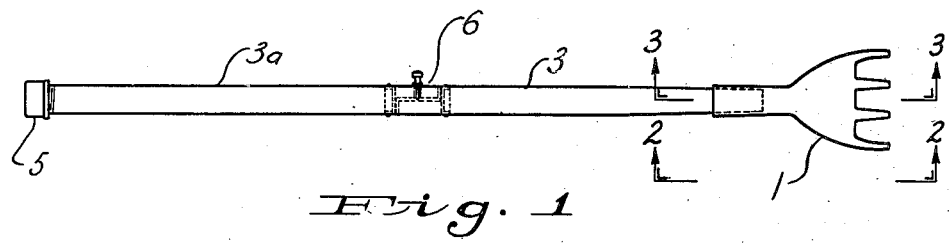
Fig. 1
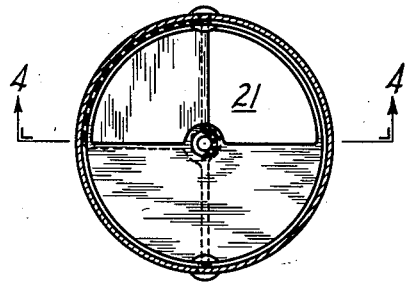
Fig. 5
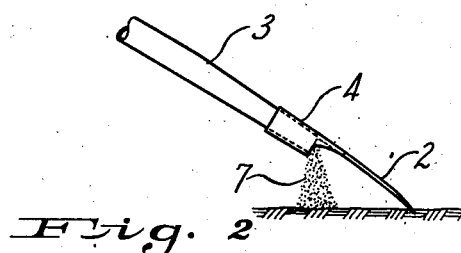
Fig. 2
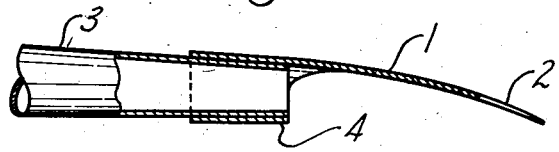
Fig. 3
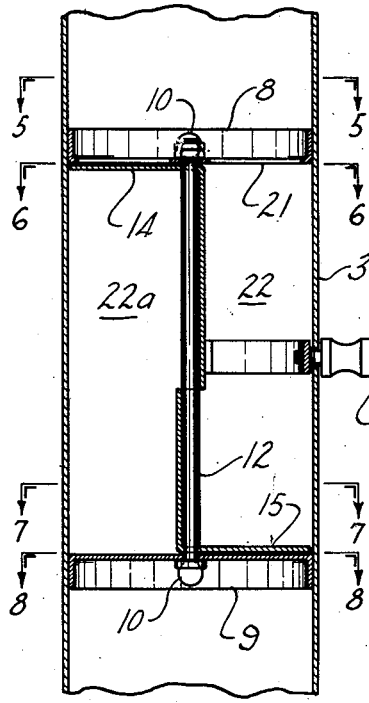
Fig. 4
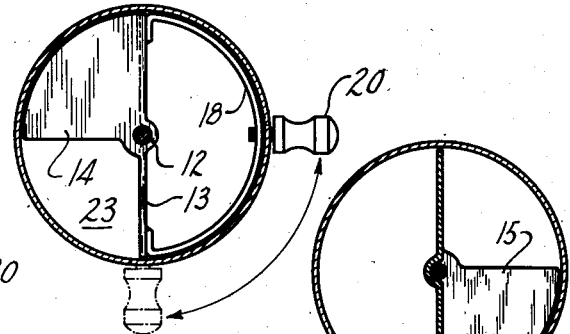
Fig. 6
Fig. 7
INVENTOR.
William F. Peyton
BY William B. Jaspert
Attorney Sept. 23, 1952 W. F. PEYTON 2,611,514
CULTIVATING IMPLEMENT WITH FERTILIZER DISPENSER IN HANDLE
Filed Jan. 31, 1947 2 SHEETS—SHEET 2

INVENTOR.
William F. Peyton
BY William B. Jaspert
Attorney.

Patented Sept. 23, 1952

2,611,514

UNITED STATES PATENT OFFICE 2,611,514

CULTIVATING IMPLEMENT WITH FERTILIZER DISPENSER IN HANDLE

William F. Peyton, Pittsburgh, Pa.

Application January 31, 1947, Serial No. 725,527

1 Claim. (Cl. 222—191)

This invention relates to new and useful improvements in a plant culture implement and more particularly to one that is adapted to distribute chemical fertilizer in measured volumes when cultivating the soil.

The invention comprises a hoe-like element having prongs for tilling the soil and having a hollow handle which constitutes the storage for fertilizer which is measured off by a valve and delivered to the cultivating end of the tool.

Figure 9:
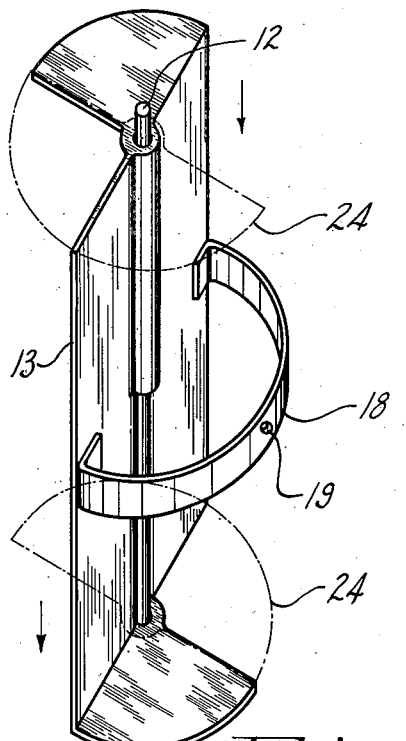
Figure 10:
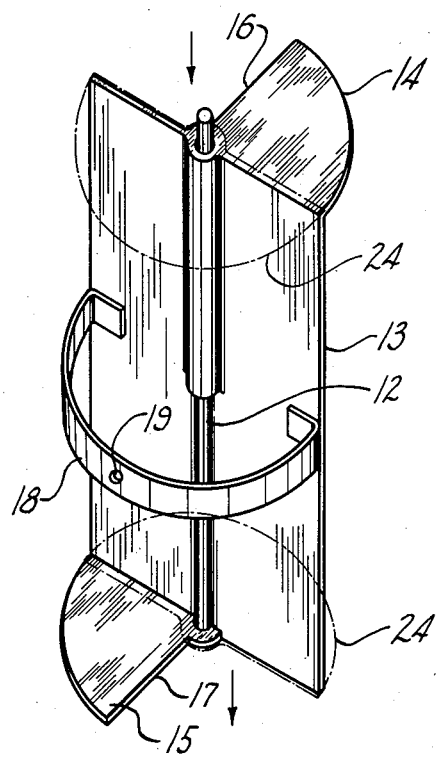
Figures 11, 12:
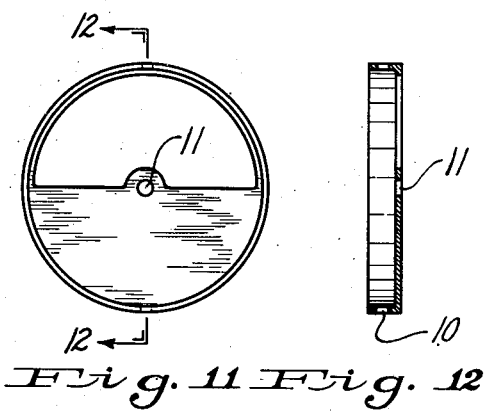

The invention will become more apparent from a consideration of the accompanying drawings constituting a part hereof, in which like reference characters designate like parts, and in which:

Fig. 1 is a top plan view of a garden tool embodying the principles of this invention;

Fig. 2 a side elevation of a portion of the tool taken along the line 2—2, Fig. 1;

Fig. 3 a vertical section, partially in elevation, of a portion of the tool taken along the line 3—3, Fig. 1;

Fig. 4 a vertical cross sectional view, partially in elevation, of the hollow handle of the tool and the measuring and distributing valve taken along the line 4—4, Fig. 5 of the drawing;

Fig. 5 a transverse cross section taken along the line 5—5, Fig. 4;

Fig. 6 a similar view taken along the line 6—6, Fig. 4;

Figs. 7 and 8 transverse sections partially in elevation of portions of the valve of Fig. 4 taken along the lines 7—7 and 8—8, Fig. 4;

Fig. 9 a view in perspective of the valve removed from the casing showing its position relative to a dotted line;

Fig. 10 is a similar view;

Fig. 11 a top plan view of one of the valve partition or end supports; and

Fig. 12 a cross-sectional view thereof taken along the line 12—12, Fig. 11.

In the drawings the numeral 1 designates a cultivating implement having fingers or prongs 2 for tilling the soil as shown in Fig. 2, the implement 1 being attached to a hollow handle 3 fitting in a socket 4 of the implement, the handle having an end closure 5 and a valve generally designated by the numeral 6.

The hollow handle 3 is open at the implement end to discharge fertilizer designated by the reference numeral 7 as shown in Fig. 2. The hollow handle portion is charged with a chemical fertilizer in the chamber 3a between the valve 6 and the end of the hollow handle, the chamber 3a when filled being closed by the screw cap 5. As is well recognized by gardeners, the use of too much or uneven distribution of chemical fertilizer has its disadvantages and is oftentimes destructive of the plants. For this reason the application of fertilizer by filling holes made with a dibble around the plant gives unsatisfactory results. Spreading it over the surface of the plants is likewise undesirable and the present invention is designed to overcome these difficulties by distributing the fertilizer in measured volumes over areas while being tilled or cultivated so as to obtain uniform distribution and having the fertilizer worked into the ground.

To this end a combined measuring hopper and discharge valve is provided in the hollow handle portion and consists of the flanged partition members 8 and 9, Fig. 4, which are shown in detail in Figs. 11 and 12, they being fastened to the wall of the handle 3 by rivets through perforations 10, Fig. 12, and having a central opening 11, Figs. 11 and 12, for receiving a hinged pin 12, Fig. 4.

The measuring valve is mounted on pin 12 and consists of a vertical partition 13, Figs. 9 and 10, having quadrant flanges 14 and 15 with their radial edges 16 and 17, 180° apart. The valve, which is preferably made of sheet metal, is grooved at the center to receive the hinge pin 12 and a strap 18 is secured at substantially the center of the valve 13 and is provided with a perforation 19 for receiving a knob 20, Fig. 4, by which the valve may be turned in its measuring and feeding operations.

With the valve in the position shown in Fig. 4, there will be an opening 21 through the upper flange partition 8 which permits the fertilizer to drop from the storage chamber 3a of the hollow handle into the valve chamber designated by the numeral 22. As shown in Fig. 8, which is taken along the line 8—8 of Fig. 4, the opening of the bottom partition 9 is opposite the opening in the top partition 8, and as shown in Fig. 7 the quadrant flange 15 closes one-half of the opening of the bottom flange partition 9, the closed portion being in line with the opening 21 of the upper flange partition so that the fertilizer passing into the valve chamber 22 fills said chamber, which is of a size to deliver a desired amount of the fertilizer to the soil to be tilled. At the same time the valve 13 opens the passage 21 to charge fertilizer into chamber 22, the portion previously charged passes out from opening 23, Fig. 6, to the implement end 1. When the knob 20 is turned 90°, which is between fixed limit stops provided in the hollow handle portion 3, opening 21 is closed by the quadrant 14 as is also the opening 23, Fig. 6. The other half of the valve chamber designated 22a will then be in communication with the charging opening through the top partition 8 while chamber 22 will discharge its stored volume of fertilizer through the opening in the bottom partition member 9.

The closed portion of the ends of the valve for the two positions of the knob 20 is shown by the dotted lines 24, Figs. 9 and 10, for a better understanding of the construction and operation of the valve.

It will be evident from the foregoing description of the invention that an implement for distributing and working fertilizer into the soil as therein described will uniformly distribute and work the fertilizer into the ground. By means of the measuring valve the amount of fertilizer used may be definitely ascertained and controlled to assure uniform treatment of the cultivated plants.

Although one embodiment of the invention has been herein illustrated and described, it will be evident to those skilled in the art that various modifications may be made in the details of construction without departing from the principles herein set forth.

I claim:

In a tilling device having a hollow handle, a plurality of perforated partitions in said handle, a valve disposed between said partitions, said valve having a wall dividing the space between the partitions, and said partitions having openings communicating with opposite sides of the valve wall so that one-half of the space between the partition members is in communication with the openings in the upper partition while the other half communicates with the openings in the bottom partition, whereby the material in the handle above the partitions is alternately measured off in predetermined volumes between said partitions and discharged through the hollow handle to the tilling implement.

WILLIAM F. PEYTON.

REFERENCES CITED

The following references are of record in the file of this patent:

UNITED STATES PATENTS

| Number | Name | Date |
|---|---|---|
| 74,231 | Lawson | Feb. 11, 1868 |
| 232,177 | Eaton | Sept. 14, 1880 |
| 1,061,057 | Etheridge | May 6, 1913 |
| 1,238,182 | Nichols et al. | Aug. 28, 1917 |
| 1,892,992 | Moran et al. | Jan. 3, 1933 |

FOREIGN PATENTS

| Number | Country | Date |
|---|---|---|
| 47,050 | Germany | May 23, 1889 |
| 2,099 | Great Britain | Jan. 27, 1911 |
| 232,121 | Great Britain | Apr. 16, 1925 |